(12) United States Patent
Zambonelli

(10) Patent No.: US 11,081,295 B2
(45) Date of Patent: Aug. 3, 2021

(54) WINDING APPARATUS AND METHOD

(71) Applicant: MANZ ITALY S.R.L., Sasso Marconi (IT)

(72) Inventor: Luca Zambonelli, Bologna (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 119 days.

(21) Appl. No.: 16/484,237

(22) PCT Filed: Feb. 12, 2018

(86) PCT No.: PCT/IB2018/050831
§ 371 (c)(1),
(2) Date: Aug. 7, 2019

(87) PCT Pub. No.: WO2018/146638
PCT Pub. Date: Aug. 16, 2018

(65) Prior Publication Data
US 2019/0355529 A1    Nov. 21, 2019

(30) Foreign Application Priority Data

Feb. 13, 2017   (IT) .................. 102017000015423

(51) Int. Cl.
*H01G 13/00* (2013.01)
*H01G 13/02* (2006.01)
(Continued)

(52) U.S. Cl.
CPC ............ *H01G 13/02* (2013.01); *B65H 18/08* (2013.01); *B65H 23/1955* (2013.01); *B65H 2301/4143* (2013.01)

(58) Field of Classification Search
CPC ................ H01G 13/02; B65H 18/10; B65H 2301/414326; B65H 23/182;
(Continued)

(56) References Cited

U.S. PATENT DOCUMENTS 3,471,098 A * 10/1969 Jannett .................. H01G 13/02
242/411
3,713,599 A *  1/1973 Smith .................... H01F 41/09
242/437.2
(Continued)

FOREIGN PATENT DOCUMENTS

CN      102259772 A     11/2011
CN      104828610 A      8/2015
(Continued)

OTHER PUBLICATIONS

International Search Report and Written Opinion in International Application No. PCT/IB2018/050831, dated May 4, 2018 (9 pages).
(Continued)

*Primary Examiner* — Emmanuel M Marcelo
(74) *Attorney, Agent, or Firm* — Nixon Peabody LLP

(57) ABSTRACT

A winding apparatus is disclosed for winding material around a core of flat shape rotated around a rotation axis carried by a crank that is in turn carried by another crank, the three rotation axes of the core and of the two cranks being motorized independently by respective electric cams, with three distinct laws of motion programmed to cancel the variations in position and speed of the material entering the core. The winding apparatus is used for the production of electric energy storage devices.

20 Claims, 2 Drawing Sheets

(51) Int. Cl.
*B65H 18/08* (2006.01)
*B65H 23/195* (2006.01)

(58) Field of Classification Search
CPC ............... B65H 23/188; B65H 23/198; B65H 23/1955; B65H 2402/341; B65H 2555/30
See application file for complete search history.

(56) References Cited

U.S. PATENT DOCUMENTS

| | | | |
|---|---|---|---|
| 5,312,064 A | 5/1994 | Uesugi | |
| 2006/0123622 A1 | 6/2006 | Guy | |
| 2009/0159736 A1* | 6/2009 | Asano | H01F 41/082 242/444 |

FOREIGN PATENT DOCUMENTS

| | | | | |
|---|---|---|---|---|
| CN | 205058044 U | | 3/2016 | |
| CN | 112058941 A | * | 12/2020 | ............ B21C 47/02 |
| EP | 2595233 A2 | | 5/2013 | |
| JP | H06-168736 A | | 6/1994 | |
| JP | 2001-233511 A | | 8/2001 | |
| JP | 2001-243971 A | | 9/2001 | |
| JP | 2003-146538 A | | 5/2003 | |
| JP | 2012-051725 A | | 3/2012 | |
| JP | 5338223 B2 | | 11/2013 | |
| KR | 2014 0015994 A | | 2/2014 | |
| WO | WO 2011/063710 A1 | | 6/2011 | |

OTHER PUBLICATIONS

Chinese Office Action in Chinese Patent Application No. CN 201880011526.6, dated Jun. 2, 2021 (7 pages).

* cited by examiner

WINDING APPARATUS AND METHOD

CROSS-REFERENCE TO RELATED APPLICATIONS

This application is a U.S. national stage of International Application No. PCT/IB2018/050831, filed Feb. 12, 2018, which claims the benefit of and priority to Italian Patent Application No. 102017000015423, filed Feb. 13, 2017, each of which is hereby incorporated by reference herein in its entirety.

BACKGROUND OF THE INVENTION

The invention relates to a winding apparatus and method, in particular for winding material at least in part in the form of a belt, or strip or sheet.

Specifically, but not exclusively, the invention can be applied to the production of electric energy storage devices.

The prior art comprises various winding apparatuses used for the production of electric energy storage devices. In these apparatuses the winding core is in general of oblong, non-circular shape, so the movement of the material to be wound may be inconstant or uneven. Some compensating systems have been proposed for making more constant and even the movement of the material that is supplied to the winding core.

Patent publication U.S. Pat. No. 5,312,064 discloses the winding of a sheet on a rotated reel, in which a roller is driven to perform a reciprocating movement to maintain the sheet pressed against the reel.

Patent publication EP 2595233 A2 discloses an apparatus having a winding core, a compensating unit along the Y axis to compensate for the vertical shifts of the incoming belt and a compensating unit along the X axis to compensate for variations in the speed of the belt due to the winding so as to maintain uniform tension on the belt.

Patent publication KR 20140015994 A discloses a winding apparatus having a rotating core of oblong shape and a tension adjusting system that compensates for the tension variations generated by the shape of the winding core by linear alternating motion, with an auxiliary adjusting unit provided with an oscillating arm on which a tensioning roller is fixed.

Patent publication JP 6168736 A discloses a method and a winding apparatus for producing an electrodes body moving the centre of rotation of a plate along a circular trajectory.

Patent publication US 2006/0123622 A1 discloses a device for making electric energy storage elements, with laminating rollers for laminating sheets, in which the laminates are wound by winding means comprising a spindle having a shaped profile and a pressing roller that makes contact with the spindle.

Patent publication JP 2001243971 A discloses a winding device that prevents oscillations in the winding speed of the sheet material, with a winding core with a non-circular section, a roller rotating around a rotation axis and shifting means that shifts the position of the centre of the roller as a function of the rotation of the winding core.

Patent publication JP 2001233511 A discloses a winder with a winding member rotated around a winding axis Z, with revolving means arranged for shifting the winding axis Z, with a mechanism for adjusting the angular speed of the winding member and with an adjusting mechanism for adjusting the angular speed of the revolving means, for moving the winding member according to a uniform linear motion, maintaining uniform tension and avoiding oscillations in winding speed.

Patent publication JP 2003146538 A discloses a method and a winding device in which a flat winding core is supported by a movable plate on a flat surface that is perpendicular to the rotation axis of the winding core according to a horizontal and a vertical direction.

Patent publication JP 2012051725 A discloses a winding device with a non-circular core for winding the material, a motor that rotates the core and a motion transmission mechanism from the motor to the core that includes gear wheels configured so that the speed of the rotary motion transmitted by the gear wheels is variable according to the angle of the core.

SUMMARY OF THE INVENTION

One object of the invention is to provide a winding apparatus that permits regular and uniform advancement of the material/s to be wound.

One advantage is providing a winding apparatus with a compensating system that winds the material evenly even if the rotatable core, around which the material is wound, has a non-circular shape.

One advantage is to make a winding apparatus that is able to reduce oscillations and/or accelerations of the processed material/s.

One advantage is to ensure constant and uniform tension of the material/s supplied to the winding apparatus.

One advantage is to make available a winding apparatus that is suitable for the production of electric energy storage devices.

One advantage is to provide a method for the production of high quality and high performance electric energy storage devices.

One advantage is to give rise to a winding apparatus that is constructionally simple and cheap and is easily adaptable to format changes, in particular to the change of dimension and/or shape of the winding core.

One advantage is to wind with precision and reliability the material/s on a winding core, in particular with a non-circular section.

One advantage is to enable the material/s to be wound on a non-circular core, just as, if necessary, on a circular core.

Such objects and advantages and still others are achieved by an apparatus and/or by a method according to one or more of the claims set out below.

In one embodiment, an apparatus for winding material/s comprises a winding core rotated by a rotation axis that is carried by a first rotating element (crank) rotated by a rotation axis that is in turn carried by a second rotating element (crank). The aforesaid three rotation axes (of the core and of the two rotating elements) are motorised independently by respective electric cams, with three (distinct) laws of motion, one for the core-winding motion and the other two for the two compensating motions of the rotating elements.

The rotation axis of the winding core may be driven with a one-directional rotational motion, for example at a rotation speed with an undulating (sinusoidal) pattern, in particular with minimum values at nil speed. The rotation axis of the first rotating element may be driven with one-direction (continuous) rotary movement. The rotation axis of the second rotating element may be driven with one-direction (continuous) rotary movement.

The winding apparatus may be used, in particular, for the production of electric energy storage devices.

The three electric cams may be programmed with three laws of motion, one for the winding motion and the other two for the two compensating motions, configured for cancelling (or at least significantly reducing) the variation of the position of the material/s at the inlet of the core and for cancelling (or at least significantly reducing) the variation of the speed of the material/s at the inlet of the core.

BRIEF DESCRIPTION OF THE DRAWINGS

The invention can be better understood and implemented with reference to the attached drawings that illustrate an embodiment thereof by way of non-limiting example.

DETAILED DESCRIPTION

Figure 1:
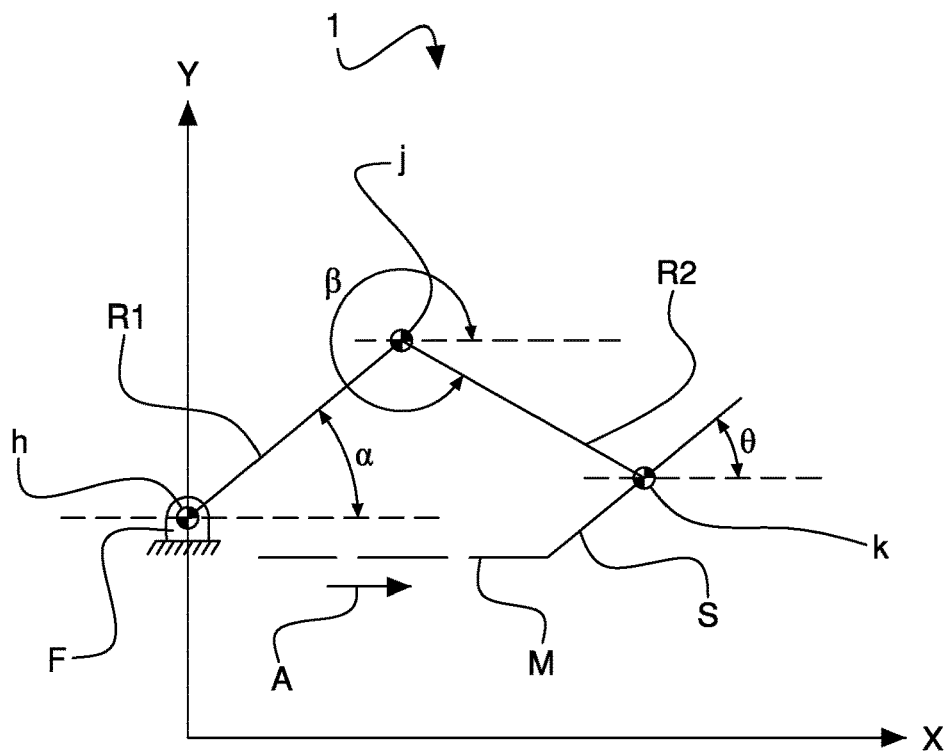
FIG. 1 shows a diagram of one embodiment of a winding apparatus made according to the present invention.
Figure 2:
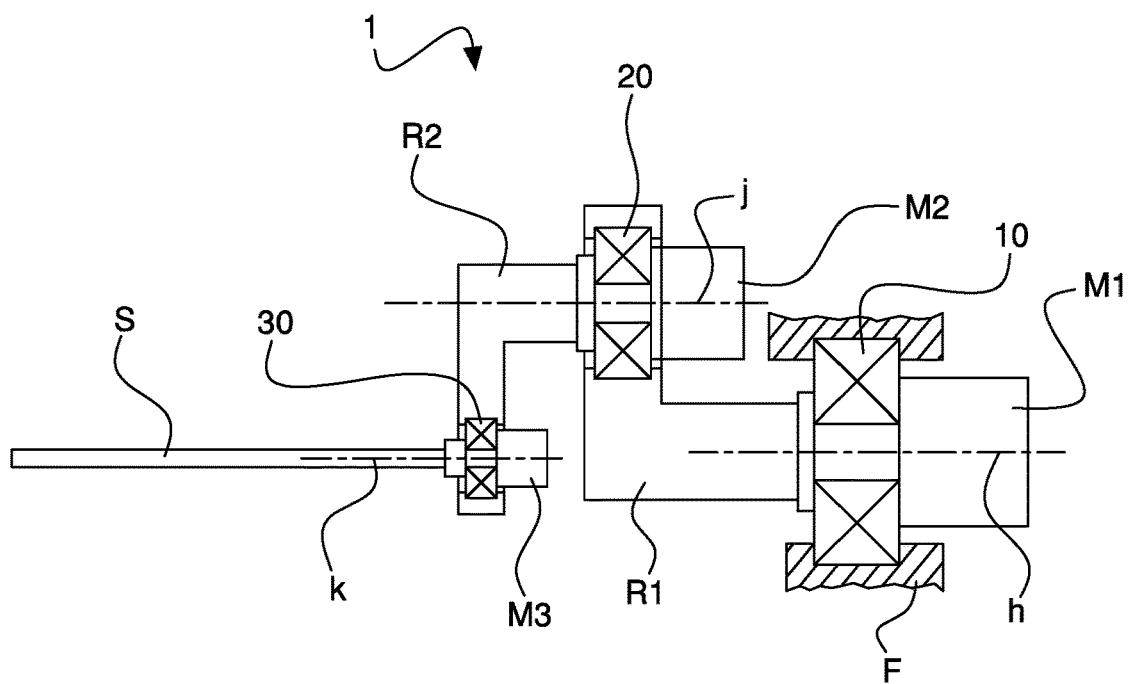
FIG. 2 is a schematic side view of one embodiment of a winding apparatus made according to the present invention.

With 1 overall a winding apparatus has been indicated, in particular for winding material/s M in the form of a belt, strip, sheet, etc, around a winding core.

The winding apparatus 1 may be used, in particular, in the production of an electric energy storage device, for example for winding material/s M comprising electrode means (for example at least one electrode membrane) and/or separator means (for example at least one separating element for electrodes, in particular a separating element that is at least in part in the form of a ribbon).

The winding apparatus 1 may comprise, in particular, supplying means (not illustrated, for example of known type) to supply the material/s M at least along one (horizontal) supplying plane. This supplying means may comprise, for example, at least one material unwinding reel.

The winding apparatus 1 may comprise, in particular, at least one frame F. The winding apparatus 1 may comprise, in particular, at least one first rotating element that is rotatably coupled with the frame F. The winding apparatus 1 may comprise, in particular, at least one second rotating element that is rotatably coupled with the first rotating element. The winding apparatus 1 may comprise, in particular, at least one winding core S of the material that is rotatably coupled with the second rotating element. The first rotating element may be rotated by motor means. The second rotating element may be rotated by motor means. The winding core S may be rotated by motor means. The first rotating element, the second rotating element and the winding core S may be rotated by drives that are independent of one another (by three drive means that are distinct and independent of one another).

The first rotating element may comprise, in particular, first crank means R1 rotated by a first (horizontal) motorized axis h carried by the frame F. The first crank means R1 may comprise, in particular, at least one first crank mounted on the frame F. The first axis h may receive the rotation motion, in particular, from a first motor M1. The first axis h may be, in particular, coaxial with a drive shaft of the first motor M1.

The second rotating element may comprise, in particular, second crank means R2 rotated by a second motorized (horizontal) axis j carried by the first crank means R1. The second crank means R2 may comprise, in particular, at least one second crank mounted on the first crank. The second axis j may receive the rotation motion, in particular, from a second motor M2. The second axis j may be, in particular, coaxial with a drive shaft of the second motor M2. The second motor M2 may be supported by the first crank means R1. The second axis j may be, in particular, parallel to the first axis h. In other examples, not illustrated, the second motor M2 could be mounted on the frame F and connected to the second axis j by a motion transmission mechanism that may comprise, for example, gearings, in particular a planetary gear (a planetary or satellite gear system).

The winding core S may comprise, in particular, a core with a section (straight cross section) of non-circular shape on which to wind the (film) material. The core S may have, for example, a section (straight cross section) of flat shape. The core S may have, for example, a section (straight cross section) of rectangular shape. The core S may be, for example, of laminar shape. The core S may have, for example, a section (straight cross section) of elliptical, oval, rhomboidal, oblong, etc shape. The core S could nevertheless have a section (straight cross section) of circular shape.

The core S may be rotated by a third (motorized) horizontal axis k carried by the second crank means R2. The third axis k may receive the rotation motion, in particular, from a third motor M3. The third axis k may be, in particular, coaxial with a drive shaft of the third motor M3. The third motor M3 may be supported by the second crank means R2. The third axis k may be, in particular, parallel to the first axis h and/or to the second axis j.

The first axis h, the second axis j and the third axis k may be, as in this embodiment, motorized independently of one another.

The first rotating element (first crank means R1) may be, in particular, rotatably coupled with the frame F by the interposition of first rolling support means 10. The second rotating element (second crank means R2) may be, in particular, rotatably coupled with the first rotating element by the interposition of second rolling support means 20 carried by the first rotating element. The winding core S may be, in particular, rotatably coupled with the second rotating element by the interposition of third rolling support means 30 carried by the second rotating element.

The winding apparatus 1 may comprise, in particular, programmable electronic control means (CPU) provided with computer programme instructions for controlling the first axis h and/or the second axis j and/or the third axis k with, respectively, a first law of motion, a second law of motion and a third law of motion.

The first law of motion may be different from the second law of motion. The second law of motion may be different from the third law of motion. The first law of motion may be different from the third law of motion. The first law of motion may comprise, in particular, a non-constant speed of rotation of the first axis h. The second law of motion may comprise, in particular, a non-constant speed of rotation of the second axis j. The third law of motion may comprise, in particular, a non-constant speed of rotation of the third axis k.

The first law of motion, the second law of motion and the third law of motion may be generated by setting as constraints at least two parameters comprising at least one position of a portion of the core S or of a portion of the material M and at least one speed of a portion of the core S or of a portion of the material M. In particular, the first law of motion, the second law of motion and third law of motion may be generated by setting the following constraints: the position of the material M at the inlet of the core S does not vary and the speed of the material M at the inlet of the core S does not vary.

Figure 3:
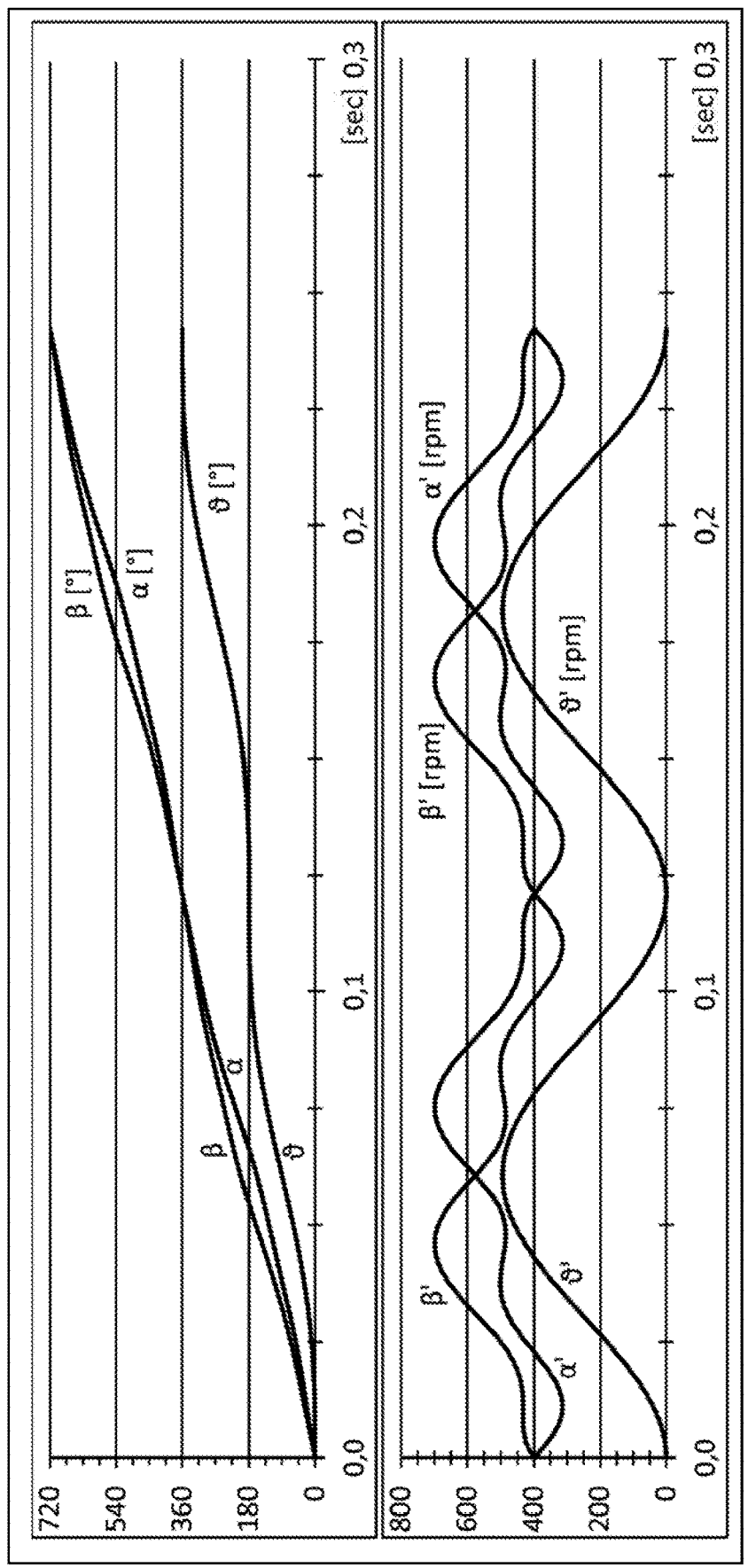
FIG. 3 shows the diagrams, in function of the time, of the angular shift and of the angular speed of the angles θ, α, β of FIG. 1.

FIG. 3 illustrates one embodiment of the pattern over time of the three laws of motion, showing, in particular, in the top graphic, the pattern of the angular shifts α (alpha), β (beta), θ (theta) (expressed in sexagesimal degrees), respectively of the first axis h, of the second axis j and of the third axis k and, further, in the bottom graphic, the corresponding pattern of the angular speeds α', β', θ' (in rpm). The angles α (alpha), β (beta), θ (theta) may be measured by taking a horizontal line as a reference (zero), as in this embodiment.

On the basis of the third law of motion, the core S could rotate, as in this embodiment, around its own axis (third axis k) at a rotation speed θ' that varies periodically, for example with a sinusoidal pattern, reaching two maximum speed values and two minimum speed values θ' in the course of a complete revolution of the core S around its own axis (third axis k). The two minimum speed values θ' may be, as in this embodiment, two values equal to zero.

On the basis of the first, of the second and of the third law of motion, one complete rotation revolution of the core S could correspond, as in this embodiment, to two complete rotation revolutions of the first crank means R1 and two complete rotation revolutions of the second crank means R2.

The first law of motion and/or the second law of motion and/or the third law of motion may be set on the basis of at least one thickness value of the material M so as to compensate the increase in the dimensions of the core S that occurs at each winding revolution due to the accumulation of the wound material M on the core.

The two rotating elements (first crank means R1 and second crank means R2) are configured in such a way as to perform, respectively, a first (orbital) compensating motion and a second (orbital) compensating motion, in particular around, respectively, a first rotation axis h and around a second rotation axis j. The compensating motions may be adjusted, in particular, in order to maintain constant the position of the material M (at least in part in film form) at the inlet of the winding core S and/or in order to maintain constant the advancement speed of the material M (in the advancement direction A) at the inlet of the core S.

In one embodiment that is not illustrated, the first motorized axis h may be connected to the drive means (first motor M1) by motion transmission means (for example gear means). In one embodiment that is not illustrated, the second motorized axis j may be connected to the drive means (second motor M2) by motion transmission means (for example gear means). In one embodiment that is not illustrated, the third motorized axis k may be connected to the drive means (third motor M3) by motion transmission means (for example gear means).

As has been seen, the three axes h, j, k may be motorized independently of one another. In particular, the three axes h, j, k may be rotated by three motors M1, M2, M3 distinct from one another. The three motors M1, M2, M3 may comprise, in particular, motors of known type (for example electric motors).

As said, the electric cams that adjust the rotation of the three axes h, j, k may be programmed (generating the three respective laws of motion) having as constraints at least two parameters that comprise one position and one speed of at least one movable body involved in the winding, for example a portion of the core S or a portion of the material M, in order to impose even motion on the material.

A first parameter may comprise, for example, the position of the material M at one end of the core S, in particular the end of the material M at the inlet of the core S, i.e. the end of the core S that, each time, at each half revolution of the winding rotation, receives the material M that advances (along the supplying plane) to be wound. The constraint may involve, for example, the end of the core S always remaining, during winding, arranged on the material M supplying plane, or near this plane.

A second parameter may comprise, for example, the speed of the material M at the aforesaid end of the core S (or the speed along the supplying plane of the material M that has to be wound). The constraint may involve, for example, the speed of the aforesaid end of the core S (or of the material M arranged on said end) always having, during winding, a constant value (in direction and/or as an absolute value) or anyway a value between a set variability range.

It is possible to involve one or more of the three rotation axes h, j, k being controlled in such a manner as to perform at least one recovery motion (for example in at least one direction that is transverse to the aforesaid supplying plane) to follow the progressive increase in volume of the product (material M) that is progressively being wound around the core S, so as to facilitate compliance with the constraints specified above.

During winding of the material M on the winding core S, the core S rotates at a rotation speed θ' controlled by an electric cam (that controls the third drive motor M3 of the third axis k) around the third rotation axis k, which in turn performs a trajectory controlled by the two electric cams that control the first drive motor M1 of the first axis h and the second drive motor M2 of the second axis j. The three electric cams are configured in such a manner that the inlet position of the material M (the position at the inlet of the core S, at the end of the core S that at each half revolution receives the material) is constant and in such a manner that also the advancement speed of the material M in the (horizontal) advancement direction A is constant.

The system disclosed above, in which the (rotation) winding motion of the core S around its own rotation axis k and the compensating motion (with two degrees of freedom, determined in this embodiment by the rotations of two axes h and j) of the rotation axis k of the core S are driven independently of one another, in particular by three distinct motorized drives, enables constancy in the position and the inlet speed of the material M to be obtained.

The first motorized axis h and the second motorized axis j may thus cooperate together to generate the compensating motion (with two degrees of freedom), i.e. the combination of the angular shift of the angle α (alpha) of the first rotating element (first crank means R1) and of the angular shift of the angle β (beta) of the second rotating element (second crank means R2). The third motorized axis k generates the winding motion that, in the case in point, comprises an angular shift of the angle θ (theta), i.e. a rotation of the core S on itself around the third axis k.

The variations in position and advancement speed of the material M at the inlet of the core S are cancelled by the three electric control cams of the drives of the three motorized axes h, j, k. As said, the laws of motion of the electric cams may be generated iteratively, taking as process constraints the inlet position and the advancement speed of the material M, calculating instant by instant the angular position θ (theta) of the winding core S, the angular position β (beta) of the second rotating element (second crank means R2) and the angular position α (alpha) of the first rotating element (first crank means R1) which are suitable for respecting the set constraints. It is possible to impose a further constraint that takes account of the gradual increase in volume of the core S at each winding revolution, as the wound material M accumulates on the core S.

As said, the graphics in the top part in FIG. 3 show one practical embodiment of the patterns of the angular positions of the rotating winding core S (angle θ (theta)), of the second rotating element (compensating angle β (beta)) and of the third rotating element (compensating angle α (alpha)) for a single winding revolution (rotation by 360° of the core S) in one winding process embodiment, in function of the time (in seconds). The graphics shown in the bottom part of FIG. 3 show the corresponding patterns of the rotation speed of the core S (winding speed θ (theta')) and of the compensating system with two degrees of freedom (speed β' (beta') and α' (alpha')), in rpm, for the same winding revolution.

It is noted that for each rotation of the winding core S (rotation by 360° del core S on itself) in this embodiment two compensating revolutions of the first axis h and two compensating revolutions of the second axis j are provided (rotation by 720° of the first crank means R1 and by 720° of the second crank means R2).

As said, the compensating system disclosed above may be controlled so as to compensate, in the revolutions following the first, the gradual increase in dimensions of the core S due to the accumulation of the wound material.

The invention claimed is:

1. A winding apparatus comprising:
    a frame;
    a first crank means rotated by a first motorized axis carried by the frame;
    a second crank means rotated by a second motorized axis carried by the first crank means;
    a core on which to wind material, the core being rotated by a third motorized axis carried by the second crank means.

2. The apparatus of claim 1, wherein the first axis, the second axis, and the third axis are motorized independently of one another.

3. The apparatus of claim 2, further comprising a programmable electronic control means provided with computer program instructions for controlling the first axis, the second axis, and the third axis with, respectively, a first law of motion, a second law of motion, and a third law of motion.

4. The apparatus of claim 3, wherein the first law of motion is different from the second law of motion.

5. The apparatus of claim 3, wherein the second law of motion is different from the third law of motion.

6. The apparatus of claim 3, wherein the first law of motion is different from the third law of motion.

7. The apparatus of claim 3, wherein the first law of motion comprises a non-constant speed of rotation.

8. The apparatus of claim 3, wherein the second law of motion comprises a non-constant speed of rotation.

9. The apparatus of claim 3, wherein the third law of motion comprises a non-constant speed of rotation.

10. The apparatus of claim 3, wherein the first law of motion, the second law of motion, and the third law of motion are generated by setting as constraints at least two parameters comprising at least one position of a portion of the core or of a portion of the material and at least one speed of a portion of the core or of the portion of the material.

11. The apparatus of claim 10, wherein the first law of motion, the second law of motion, and the third law of motion are generated by setting as constraints that the position of the material at an inlet of the core does not vary and that the speed of the material at the inlet of the core does not vary.

12. The apparatus of claim 3, wherein, on the basis of the third law of motion, the core rotates around its own axis at a rotation speed that varies periodically, reaching two maximum speed values and two minimum speed values during one complete revolution of the core around its own axis.

13. The apparatus of claim 12, wherein the two minimum speed values are two values equal to zero.

14. The apparatus of claim 3, wherein, on the basis of the first law of motion, the second law of motion, and the third law of motion, one complete rotation revolution of the core around the third axis corresponds to two complete rotation revolutions of the first crank means around the first axis.

15. The apparatus of claim 3, wherein, on the basis of the first law of motion, the second law of motion, and the third law of motion, one complete revolution of the core around the third axis corresponds to two complete rotation revolutions of the second crank means around the second axis.

16. The apparatus of claim 3, wherein the first law of motion, the second law of motion, the third law of motion, or any combination thereof are set on the basis of at least one value of a dimension of the material to compensate for an increase in dimensions of the core due to an accumulation of wound material.

17. The apparatus of claim 16, wherein the value of a dimension of the material comprises a thickness of the material.

18. The apparatus of claim 1, further comprising at least one motion transmission mechanism that connects the second axis to motor means fixed to the frame.

19. The apparatus of claim 1, wherein the core has a non-circular shape.

20. A method for the production of electric energy storage devices by use of a winding apparatus, the winding apparatus comprising:
    a frame;
    a first crank means rotated by a first motorized axis carried by the frame;
    a second crank means rotated by a second motorized axis carried by the first crank means;
    a core on which to wind material, the core being rotated by a third motorized axis carried by the second crank means;
    wherein the winding apparatus is used for one or more of winding electrode means and separator means.

* * * * *